United States Patent
Shijo

(10) Patent No.: US 10,040,106 B2
(45) Date of Patent: *Aug. 7, 2018

(54) ROLLS OF WINDING EQUIPMENT IN HOT-ROLLING FACTORY

(71) Applicant: NIPPON STEEL & SUMIKIN HARDFACING CO., LTD., Tokyo (JP)

(72) Inventor: Koichi Shijo, Tokyo (JP)

(73) Assignee: NIPPON STEEL & SUMIKIN HARDFACING CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/035,096

(22) PCT Filed: May 28, 2014

(86) PCT No.: PCT/JP2014/002833
§ 371 (c)(1),
(2) Date: May 6, 2016

(87) PCT Pub. No.: WO2015/181852
PCT Pub. Date: Dec. 3, 2015

(65) Prior Publication Data
US 2016/0256907 A1   Sep. 8, 2016

(51) Int. Cl.
*B21B 27/02* (2006.01)
*B21C 47/00* (2006.01)
(Continued)

(52) U.S. Cl.
CPC ............ *B21B 27/021* (2013.01); *B21C 47/00* (2013.01); *B21C 47/06* (2013.01); *B21C 47/063* (2013.01);
(Continued)

(58) Field of Classification Search
CPC .. C23C 4/04; C23C 4/06; C23C 4/067; C23C 4/129; C23C 4/134; C23C 4/123;
(Continued)

(56) References Cited

U.S. PATENT DOCUMENTS 4,064,608 A * 12/1977 Jaeger ..................... C23C 4/08
427/236
4,160,048 A * 7/1979 Jaeger ................. B05B 13/0442
427/142
(Continued)

FOREIGN PATENT DOCUMENTS

JP    S55-140710 A    11/1980
JP    S55-149710 A    11/1980
(Continued)

OTHER PUBLICATIONS

PCT/IPEA/338, "Notification of Transmittal of Translation of the International Preliminary Report on Patentability for International Application No. PCT/JP2014/002833," dated Dec. 1, 2016.
(Continued)

*Primary Examiner* — Jason L Vaughan
(74) *Attorney, Agent, or Firm* — Manabu Kanesaka

(57) ABSTRACT

In rolls of winding equipment in a hot-rolling factory, each roll includes a lower cladding layer formed on the surface of the roll barrel and a self-fluxing alloy layer formed on the lower cladding layer by thermal spraying and containing carbide particles dispersed therein. The lower cladding layer includes an Fe-based cladding layer which has a Shore hardness of 60 or greater and which contains, in terms of mass %, 0.1-0.4 C, up to 2.0 Si, up to 3.0 Mn, 1.0-15.0 Cr, and 2.5-5.0 Ni. The lower cladding layer further contains one or more of Mo, V, and Co, the contents of Mo, V, and Co being 0.1-5.0 mass %, 0.1-3.0 mass %, and 0.5-5.0 mass %, respectively.

6 Claims, 1 Drawing Sheet

(51) Int. Cl.
| | | |
|---|---|---|
| B21C 47/06 | (2006.01) | |
| B23K 35/30 | (2006.01) | |
| C23C 4/06 | (2016.01) | |
| C23C 4/18 | (2006.01) | |
| B65H 18/28 | (2006.01) | |
| C23C 4/12 | (2016.01) | |
| B65H 18/02 | (2006.01) | |
| C23C 28/02 | (2006.01) | |
| B21B 15/00 | (2006.01) | |

(52) U.S. Cl.
CPC .......... B23K 35/30 (2013.01); B65H 18/025 (2013.01); B65H 18/28 (2013.01); C23C 4/06 (2013.01); C23C 4/12 (2013.01); C23C 4/18 (2013.01); C23C 28/021 (2013.01); C23C 28/027 (2013.01); *B21B 2015/0057* (2013.01); *B65H 2404/147* (2013.01); *B65H 2701/173* (2013.01)

(58) Field of Classification Search
CPC ......... C23C 4/126; C23C 4/131; C23C 4/137; C23C 4/14; C23C 4/16; B21B 27/00; B21B 27/02; B21B 27/021; B21B 27/022; B21B 27/03; B21B 27/032; B21B 2015/0057; B21B 2015/0064; B21B 2267/24
See application file for complete search history.

(56) References Cited

U.S. PATENT DOCUMENTS

| | | | | |
|---|---|---|---|---|
| 4,986,181 A * | 1/1991 | Kobayashi | ............... | B41N 7/06 101/348 |
| 5,070,587 A * | 12/1991 | Nakahira | ............... | B21B 39/008 432/246 |
| 5,081,760 A * | 1/1992 | Kikuhara | ............... | B21B 27/00 492/3 |
| 5,161,306 A * | 11/1992 | Nakahira | ............... | B21B 39/008 148/278 |
| 5,316,859 A * | 5/1994 | Harada | ................... | C23C 2/003 29/895 |
| 5,397,650 A * | 3/1995 | Harada | ................... | C23C 2/003 428/546 |
| 5,484,372 A * | 1/1996 | Nawata | ................... | B21B 27/00 148/541 |
| 5,944,644 A | 8/1999 | Katayama et al. | | |
| 6,284,062 B1 * | 9/2001 | Nagashima | ............... | C23C 2/00 148/230 |
| 6,326,063 B1 * | 12/2001 | Harada | ..................... | C23C 4/18 427/350 |
| 8,507,105 B2 * | 8/2013 | Jarosinski | ............... | B22F 3/115 428/550 |

FOREIGN PATENT DOCUMENTS

| | | |
|---|---|---|
| JP | S57-134013 A | 8/1982 |
| JP | H03-238107 A | 10/1991 |
| JP | H04-123872 A | 4/1992 |
| JP | H08-121464 A | 5/1996 |
| JP | H08-232058 A | 9/1996 |
| JP | H09-067054 A | 3/1997 |
| JP | H11-267731 A | 10/1999 |
| JP | 2000-254715 A | 9/2000 |

OTHER PUBLICATIONS

PCT/IPEA/409, "International Preliminary Report on Patentability for International Application No. PCT/JP2014/002833."
PCT International Search Report of PCT/JP2014/002833.
Japan Patent Office, "Office Action for Japanese Patent Application No. 2016-522979," dated May 8, 2018.

* cited by examiner

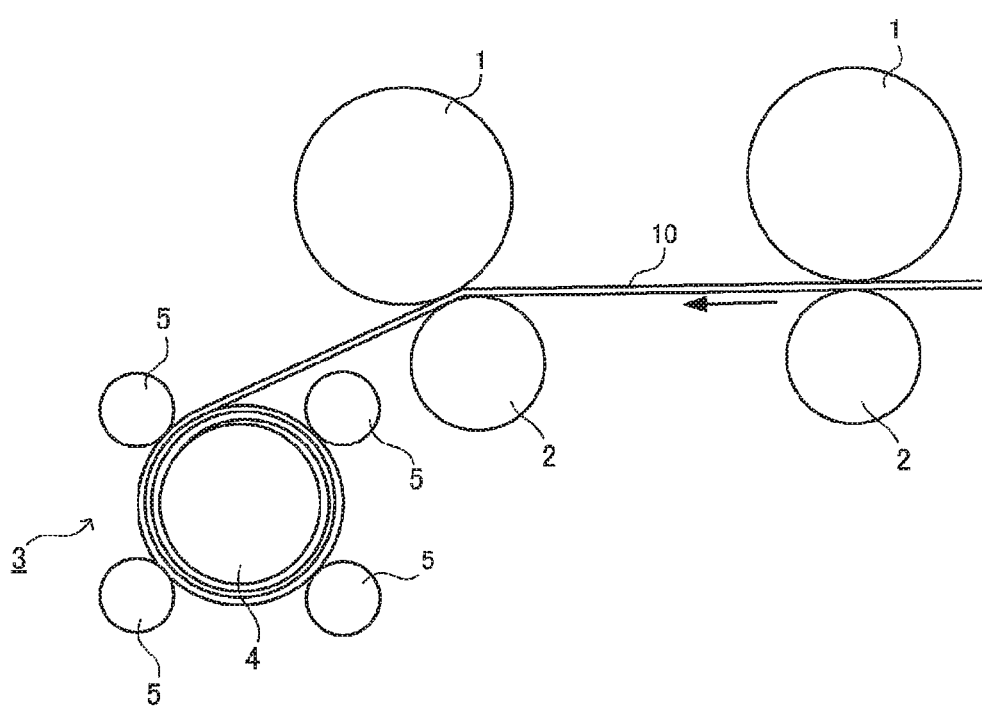

ROLLS OF WINDING EQUIPMENT IN HOT-ROLLING FACTORY

RELATED APPLICATIONS

The present application is National Phase of International Application No. PCT/JP2014/002833 filed May 28, 2014, the disclosure of which is hereby incorporated by reference herein in its entirety.

TECHNICAL FIELD

The present invention relates to rolls of winding equipment in a hot-rolling factory, and in particular, a composition of a coating layer which coats the surface of each roll.

BACKGROUND ART

Rolls provided in winding equipment in a hot-rolling factory are worn by sliding with a threading material and impact during entry of the threading material. Therefore, it is known that a lower cladding layer is formed on the surfaces of the rolls and an overlying self-fluxing alloy layer is formed on the lower cladding layer by thermal spraying to protect the rolls (for example see Patent Literatures 1 to 3).

Patent Literature 1 discloses a lower cladding layer including 0.15 mass % C, 0.40 mass % Si, 1.80 mass % Mn, 3.0 mass % Cr, 2.0 mass % Mo, 0.80 mass % V, 2.0 mass % Ni, and 1.0 mass % Co with the balance being Fe and unavoidable impurities. Patent Literature 2 discloses a lower cladding layer including 0.25 mass % C, 0.5 mass % Si, 1.2 mass % Mn, 13.0 mass % Cr, 0.7 mass % Mo, and 1.5 mass % Ni with the balance being Fe and unavoidable impurities. Patent Literature 3 discloses a lower cladding layer including 0.26% C, 0.32% Si, 1.13% Mn, 13.3% Cr, 0.74% Mo, and 1.16% Ni with the balance being Fe and unavoidable impurities.

CITATION LIST

Patent Literature

Patent Literature 1: JPS55-149710
Patent Literature 2: JPH8-121464
Patent Literature 3: JPH9-67054

SUMMARY OF INVENTION

Technical Problem

In recent years, since the quality of winding threading material in a hot-rolling factory is changed (e.g., increase in high-carbon material, high tensile strength steel plate, and planking and application to checker plate-winding roll), a hardness required for a lower cladding layer is higher than in the past. However, the lower cladding layer described in each of the Patent Literatures described above has a Shore hardness of 50 or more, that is, a Shore hardness less than 60. Therefore, when the overlying self-fluxing alloy thermally-sprayed layer is brought into contact with a plate material during threading, the overlying self-fluxing alloy thermally-sprayed layer dents and is cracked.

Recently, the overlying self-fluxing alloy thermally-sprayed layer may be fused a plurality of times. The present inventors have found that when the overlying self-fluxing alloy thermally-sprayed layer described in each of the aforementioned Patent Literatures is fused a plurality of times, the hardness of the lower cladding layer is largely decreased.

An object of the invention of the present application is to provide rolls of winding equipment in a hot-rolling factory, the rolls each including an overlying self-fluxing alloy thermally-sprayed layer and a lower cladding layer on the surface, wherein the lower cladding layer has a Shore hardness of 60 or more.

Solution to Problem

In order to solve the above-described problems, rolls of winding equipment in a hot-rolling factory according to the invention of the present application are (1) rolls of winding equipment in a hot-rolling factory, each of the rolls including a lower cladding layer formed on a surface of a barrel of the roll and a self-fluxing alloy layer formed on the lower cladding layer by thermal spraying and containing carbide particles dispersed therein, wherein the lower cladding layer includes an Fe-based cladding layer which has a Shore hardness of 60 or more and contains 0.1 to 0.4 mass % C, 2.0 mass % or less Si, 3.0 mass % or less Mn, 1.0 to 15.0 mass % Cr, and 2.5 to 5.0 mass % Ni.

(2) In the configuration of (1) above, the lower cladding layer further contains one or more of Mo, V, and Co, and contents of Mo, V, and Co may be 0.1 to 5.0 mass %, 0.1 to 3.0 mass %, and 0.5 to 5.0 mass %, respectively.

(3) In the configuration of (1) or (2) above, the lower cladding layer has a Shore hardness of 60 or more even when the self-fluxing alloy thermally-sprayed layer is fused a plurality of times.

Advantageous Effects of Invention

According to the invention of the present application, in rolls of winding equipment in a hot-rolling factory each including an overlying self-fluxing alloy thermally-sprayed layer and a lower cladding layer on the surface, the Shore hardness of the lower cladding layer can be set to 60 or more.

BRIEF DESCRIPTION OF DRAWINGS

FIG. 1 is a schematic view of winding equipment in a hot-rolling factory.

DESCRIPTION OF EMBODIMENTS

FIG. 1 is a schematic view of winding equipment in a hot-rolling factory. With reference to FIG. 1, the winding equipment in the hot-rolling factory is provided with a plurality of coilers 3 which wind a steel plate 10 of high temperature of 400 to 900° C. which is rolled into a fixed size by a finishing rolling mill, and upper and lower pinch rolls 1 and 2 which are disposed at a fore stage of the respective coilers 3. The plurality of coilers 3, the upper and lower pinch rolls 1 and 2 are provided in the same rolling line.

The coilers 3 are provided with a mandrel 4 for winding the steel plate 10, and a plurality of wrapper rolls 5 which are disposed around the mandrel 4 to press the steel plate 10 against the mandrel 4. The upper and lower pinch rolls 1 and 2 change the direction conveying of the steel plate 10 conveyed from the finishing rolling mill to a side of the coilers 3 disposed obliquely downward so as to allow the steel plate 10 to be wound around the coilers 3, or allow the steel plate 10 to be horizontally conveyed as they are and wound around the coilers 3 disposed downstream. The upper and lower pinch rolls 1 and 2 have a function of imparting a backward tension to the steel plate 10 so as to stably wind the steel plate 10 around the coilers 3.

On the surfaces of barrels of the above-mentioned pinch rolls 1 and 2 and the wrapper rolls 5, a lower cladding layer is formed. On the lower cladding layer, a self-fluxing alloy layer containing carbide particles dispersed therein is formed by thermal spraying. For a roll base material used for these pinch rolls 1 and 2 and wrapper rolls 5, that is, the rolls of winding equipment in the hot-rolling factory, an iron-based metal can be used.

For the self-fluxing alloy thermally-sprayed layer, for example, a deposited alloy containing 3 to 60 wt % carbide particles dispersed in a base metal can be used. For the base metal, Ni-based metal, Co-based metal, or Fe-based metal can be used. When 3 to 60 wt % carbide particles are dispersed and contained, abrasion resistance is enhanced. When the amount of carbide particles to be added is less than 3 wt %, the distribution of carbide particles in the structure is likely to be biased due to a relationship between the size and a trace amount of carbide particles to be added. The abrasion resistance cannot be sufficiently secured.

When the amount of carbide particles to be added is more than 60 wt %, the cost is increased due to a decrease in yield of carbide, a crack may be generated during a manufacturing process due to a decrease in toughness of a coating film itself, and fusing failure of the thermally-sprayed layer may occur.

For carbide to be dispersed in the deposited alloy, one or more of WC, $W_mC_n$, $Cr_3C_2$, NbC, VC, MoC, TiC, and SiC which are carbide that can be granulated can be used as a thermal spraying material. A combination of the carbide with any of Ni-based metal, Co-based metal, and Fe-based metal serving as base metal can change characteristics such as abrasion resistance, thermal shock resistance, and slip seizure resistance of each roll. For this reason, a material suitable for a condition of the winding equipment in the hot-rolling factory can be appropriately selected.

When the deposited alloy is fused, the self-fluxing alloy thermally-sprayed layer is formed. The fusing is a treatment in which a thermal spraying powder is thermally sprayed, reheated, and remelt. Even when the lower cladding layer of this embodiment is thus fused a plurality of times, the Shore hardness (Hs) is not less than 60. Specifically, when the overlying deposited alloy is fused, the lower cladding layer receives heat of the fusing. In the lower cladding layer disclosed in each of Patent Literatures 1 to 3, the lower cladding layer is heated a plurality of times, and as a result, the Shore hardness (Hs) is largely decreased. On the other hand, even when a lower cladding layer satisfying the composition of this embodiment receives heat of the fusing, the Shore hardness (Hs) is not decreased to less than 60. Therefore, the overlying self-fluxing alloy thermally-sprayed layer is unlikely to dent and be cracked.

The lower cladding layer of this embodiment includes an Fe-based cladding layer which has a Shore hardness of 60 or more and contains 0.1 to 0.4 mass % C, 2.0 mass % or less Si, 3.0 mass % or less Mn, 1.0 to 15.0 mass % Cr, and 2.5 to 5.0 mass % Ni. Hereinafter, a reason of limitation of components of the lower cladding layer will be described.

C: 0.1 to 0.4

C is required to improve the mechanical strength and hardness of the cladding layer. However, when the content of C is more than 0.4 mass %, a crack is generated during cladding by welding.

Si: 2.0 or less

When the content of Si exceeds 2.0 mass %, a crack is generated during cladding by welding, and the toughness and hardness are decreased. In order to deoxidize weld metal, it is preferable that at least 0.2 mass % or more Si be added.

Mn: 3.0 or less

When the content of Mn exceeds 3.0 mass %, the hardness is decreased. In order to deoxidize weld metal, it is preferable that at least 0.5 mass % or more Mn be added.

Cr: 1.0 to 15.0

When Cr is used, the overlying self-fluxing alloy thermally-sprayed layer during fusing receives heat of the fusing to increase the temperature to an austenite region. When the layer is cooled after the fusing, the structure changes from an austenite structure to a martensite structure. Therefore, the hardness is improved. When the content of Cr is less than 1 mass %, the aforementioned effect is not obtained. When the content of Cr exceeds 15 mass %, the austenite structure is increased, and the hardness is largely decreased. The content of Cr is preferably 8.0 mass % or less. When the content of Cr is limited to 8 mass % or less, the decrease in hardness due to the increase of the austenite structure can be sufficiently suppressed.

Ni: 2.5 to 5.0

Under the present invention, the prerequisite is fusing a thermally-sprayed coating film formed on a lower cladding layer to form a self-fluxing alloy thermally-sprayed layer. However, if the coating film just after the fusing is slowly cooled, excessive residual stress is generated in the self-fluxing alloy thermally-sprayed layer. In order to suppress the increased residual stress after the fusing, the temperature of rolls is maintained in general. Specifically, the self-fluxing alloy thermally-sprayed layer having been heated over 1000° C. by the fusing is kept so that the temperature thereof is not below a predetermined heat-retaining temperature (for example, 600° C.) for a predetermined time (for example, 5 hours), and then the layer is slowly cooled.

Therefore, since the cladding layer receives heat of the fusing to increase the temperature to an austenite region and is kept at the heat-maintaining temperature for the predetermined time, this causes ferrite-pearlite transformation, thereby decreasing the hardness of the cladding layer.

Ni has an advantageous effect in which the A3 transformation point during the transformation from the austenite structure to the ferrite-pearlite structure is lowered. This can prevent the transformation from the austenite structure to the ferrite-pearlite structure during the heat-maintaining process, and thereby the hardness is prevented from decreasing. Further, Ni has an effect of improving toughness. However, when the content of Ni exceeds 5 mass %, the hardness is decreased.

The lower cladding layer may further contain one or more of Mo, V, and Co. The contents of Mo, V, and Co may be 0.1 to 5.0 mass %, 0.1 to 3.0 mass %, and 0.5 to 5.0 mass %, respectively.

Mo: 0.1 to 5.0

Mo has an effect of increasing high-temperature hardness. However, when the content of Mo is less than 0.1%, the effect is not expressed. Even when the added amount of Mo exceeds 5.0%, the effect is saturated, and the significantly improving effect of hardness is not expected.

V: 0.1 to 3.0

V has an effect of increasing high-temperature hardness. However, when the content of V is less than 0.1%, the effect is not expressed. Even when the content of V exceeds 3.0%, the effect is saturated, and the significantly improving effect of hardness is not expected.

Co: 0.5 to 5.0

Co has an effect of increasing high-temperature hardness. However, when the content of Co is less than 0.5%, the effect is not expressed. Even when the content of Co exceeds 5.0%, the effect is saturated, and the significantly improving effect of hardness is not expected. Since Co is expensive, the upper limit is 5.0%.

Hereinafter, the present invention will be described more specifically with reference to Examples. As shown in Table 1, in rolls formed of various compositions, the Shore hardness were examined. A certain thermal spraying material was thermally sprayed and fused, the thermally-sprayed coating film was removed by lathing processing, and the hardness of a surface of a lower cladding layer was measured by a Shore hardness meter. An overlying thermally-sprayed layer was formed by thermally spraying Ni-based self-fluxing alloy thermal spraying material containing carbide particles dispersed therein by a gas flame spraying method. The number of fusing treatment for the overlying thermally-sprayed layer was three.

When the Shore hardness is 60 or more and a crack is not generated, the roll is evaluated as pass with "good". When the Shore hardness is less 60 regardless of the presence or absence of crack, the roll is evaluated as fail with "poor". When a crack is generated regardless of degree of the Shore hardness, the roll is evaluated as fail with "poor".

TABLE 1

| TEST TARGET | COMPOSITION OF LOWER CLADDING LAYER OTHER THAN Fe AND UNAVOIDABLE IMPURITIES (MASS %) | | | | | | | | SHORE HARDNESS | PRESENCE OR ABSENCE OF CRACK | EVALUATION |
|---|---|---|---|---|---|---|---|---|---|---|---|
| | C | Si | Mn | Cr | Ni | Mo | V | Co | | | |
| EXAMPLE 1 | 0.1 | 0.5 | 1.8 | 4.0 | 3.0 | | | | 62 | ABSENCE | GOOD |
| EXAMPLE 2 | 0.2 | 0.5 | 1.8 | 4.0 | 3.0 | | | | 65 | ABSENCE | GOOD |
| EXAMPLE 3 | 0.3 | 0.5 | 1.8 | 4.0 | 3.0 | | | | 72 | ABSENCE | GOOD |
| EXAMPLE 4 | 0.4 | 0.5 | 1.8 | 4.0 | 3.0 | | | | 75 | ABSENCE | GOOD |
| EXAMPLE 5 | 0.2 | 0.5 | 1.8 | 4.0 | 3.0 | 0.05 | | | 65 | ABSENCE | GOOD |
| EXAMPLE 6 | 0.2 | 0.5 | 1.8 | 4.0 | 3.0 | 0.1 | | | 67 | ABSENCE | GOOD |
| EXAMPLE 7 | 0.2 | 0.5 | 1.8 | 4.0 | 3.0 | 5 | | | 69 | ABSENCE | GOOD |
| EXAMPLE 8 | 0.2 | 0.5 | 1.8 | 4.0 | 3.0 | 6 | | | 69 | ABSENCE | GOOD |
| EXAMPLE 9 | 0.2 | 0.5 | 1.8 | 4.0 | 3.0 | | 0.05 | | 65 | ABSENCE | GOOD |
| EXAMPLE 10 | 0.2 | 0.5 | 1.8 | 4.0 | 3.0 | | 0.1 | | 68 | ABSENCE | GOOD |
| EXAMPLE 11 | 0.2 | 0.5 | 1.8 | 4.0 | 3.0 | | 3 | | 70 | ABSENCE | GOOD |
| EXAMPLE 12 | 0.2 | 0.5 | 1.8 | 4.0 | 3.0 | | 4 | | 70 | ABSENCE | GOOD |
| EXAMPLE 13 | 0.2 | 0.5 | 1.8 | 4.0 | 3.0 | | | 0.3 | 65 | ABSENCE | GOOD |
| EXAMPLE 14 | 0.2 | 0.5 | 1.8 | 4.0 | 3.0 | | | 0.5 | 66 | ABSENCE | GOOD |
| EXAMPLE 15 | 0.2 | 0.5 | 1.8 | 4.0 | 3.0 | | | 5 | 67 | ABSENCE | GOOD |
| EXAMPLE 16 | 0.2 | 0.5 | 1.8 | 4.0 | 3.0 | | | 6 | 67 | ABSENCE | GOOD |
| EXAMPLE 17 | 0.2 | 2 | 1.8 | 4.0 | 3.0 | | | | 65 | ABSENCE | GOOD |
| EXAMPLE 18 | 0.2 | 0.5 | 3 | 4.0 | 3.0 | | | | 65 | ABSENCE | GOOD |
| EXAMPLE 19 | 0.2 | 0.5 | 1.8 | 1 | 3.0 | | | | 61 | ABSENCE | GOOD |
| EXAMPLE 20 | 0.2 | 0.5 | 1.8 | 8 | 3.0 | | | | 68 | ABSENCE | GOOD |
| EXAMPLE 21 | 0.2 | 0.5 | 1.8 | 15 | 3.0 | | | | 62 | ABSENCE | GOOD |
| EXAMPLE 22 | 0.2 | 0.5 | 1.8 | 4.0 | 2.5 | | | | 62 | ABSENCE | GOOD |
| EXAMPLE 23 | 0.2 | 0.5 | 1.8 | 4.0 | 5 | | | | 61 | ABSENCE | GOOD |
| COMPARATIVE EXAMPLE 1 | 0.05 | 0.5 | 1.8 | 4.0 | 3.0 | | | | 48 | ABSENCE | POOR |
| COMPARATIVE EXAMPLE 2 | 0.5 | 0.5 | 1.8 | 4.0 | 3.0 | | | | 80 | PRESENCE | POOR |
| COMPARATIVE EXAMPLE 3 | 0.2 | 3 | 1.8 | 4.0 | 3.0 | | | | 62 | PRESENCE | POOR |
| COMPARATIVE EXAMPLE 4 | 0.2 | 0.5 | 4 | 4.0 | 3.0 | | | | 58 | ABSENCE | POOR |
| COMPARATIVE EXAMPLE 5 | 0.2 | 0.5 | 1.8 | 0.5 | 3.0 | | | | 55 | ABSENCE | POOR |
| COMPARATIVE EXAMPLE 6 | 0.2 | 0.5 | 1.8 | 17 | 3.0 | | | | 52 | ABSENCE | POOR |
| COMPARATIVE EXAMPLE 7 | 0.2 | 0.5 | 1.8 | 4.0 | 1 | | | | 55 | ABSENCE | POOR |
| COMPARATIVE EXAMPLE 8 | 0.2 | 0.5 | 1.8 | 4.0 | 2 | | | | 59 | ABSENCE | POOR |
| COMPARATIVE EXAMPLE 9 | 0.2 | 0.5 | 1.8 | 4.0 | 6 | | | | 58 | ABSENCE | POOR |

In Examples 2, 17, 18, and 22, and Comparative Examples 7 and 8, the number of fusing was changed to 1, 2, 3, 4, and 5. In each case, the Shore hardness was examined. The test results are shown in Table 2.

TABLE 2

| | NUMBER OF FUSING | | | | |
|---|---|---|---|---|---|
| | once | twice | three times | four times | five times |
| EXAMPLE 2 | 65 | 65 | 65 | 64 | 64 |
| EXAMPLE 17 | 65 | 65 | 65 | 64 | 64 |
| EXAMPLE 18 | 65 | 65 | 65 | 64 | 64 |
| EXAMPLE 22 | 63 | 63 | 62 | 60 | 60 |
| COMPARATIVE EXAMPLE 7 | 63 | 58 | 55 | 53 | 50 |
| COMPARATIVE EXAMPLE 8 | 63 | 60 | 59 | 57 | 57 |

In Comparative Examples 7 and 8, the Shore hardness was significantly decreased according to an increase in the number of fusing. In Comparative Example 7, the Shore hardness was decreased to less than 60 when the number of fusing was 2 or more. In Comparative Example 8, the Shore hardness was decreased to less than 60 when the number of fusing was 3 or more. On the other hand, in Examples 2, 17, 18, and 22 of the present invention, the degree of decrease in the Shore hardness due to an increase in the number of fusing was small. Even when the number of fusing reached 5, a Shore hardness of 60 or more was secured.

The invention claimed is:

1. A roll of winding equipment in a hot-rolling factory, comprising:
   a barrel of the roll;
   a lower cladding layer formed on a surface of the barrel of the roll; and
   a self-fluxing alloy layer formed on the lower cladding layer by thermal spraying and containing carbide particles dispersed therein,
   wherein the lower cladding layer includes an Fe-based cladding layer which has a Shore hardness of 60 or more and contains 0.1 to 0.4 mass % C, 2.0 mass % or less Si, 3.0 mass % or less Mn, 1.0 to 15.0 mass % Cr, and 2.5 to 5.0 mass % Ni, and the self-fluxing alloy layer contains 3 to 60 mass % of the carbide particles.

2. The roll of winding equipment in the hot-rolling factory according to claim 1, wherein the lower cladding layer further contains 0.1 to 5.0 mass % Mo.

3. The roll of winding equipment in the hot-rolling factory according to claim 2, wherein the lower cladding layer has the Shore hardness of 60 or more when the self-fluxing alloy thermally-sprayed layer is fused for a plurality of times.

4. The roll of winding equipment in the hot-rolling factory according to claim 1, wherein the lower cladding layer has the Shore hardness of 60 or more when the self-fluxing alloy thermally-sprayed layer is fused a plurality of times.

5. The roll of winding equipment in the hot-rolling factory according to claim 1, wherein the lower cladding layer further contains one or more of V and Co, and contents of V and Co are 0.1 to 3.0 mass %, and 0.5 to 5.0 mass %, respectively.

6. The roll of winding equipment in the hot-rolling factory according to claim 5, wherein the lower cladding layer has the Shore hardness of 60 or more when the self-fluxing alloy thermally-sprayed layer is fused for a plurality of times.

* * * * *